R. LIEBAU.
VEHICLE AIR SPRING.
APPLICATION FILED APR. 12, 1913. RENEWED DEC. 4, 1913.
1,148,177.
Patented July 27, 1915.
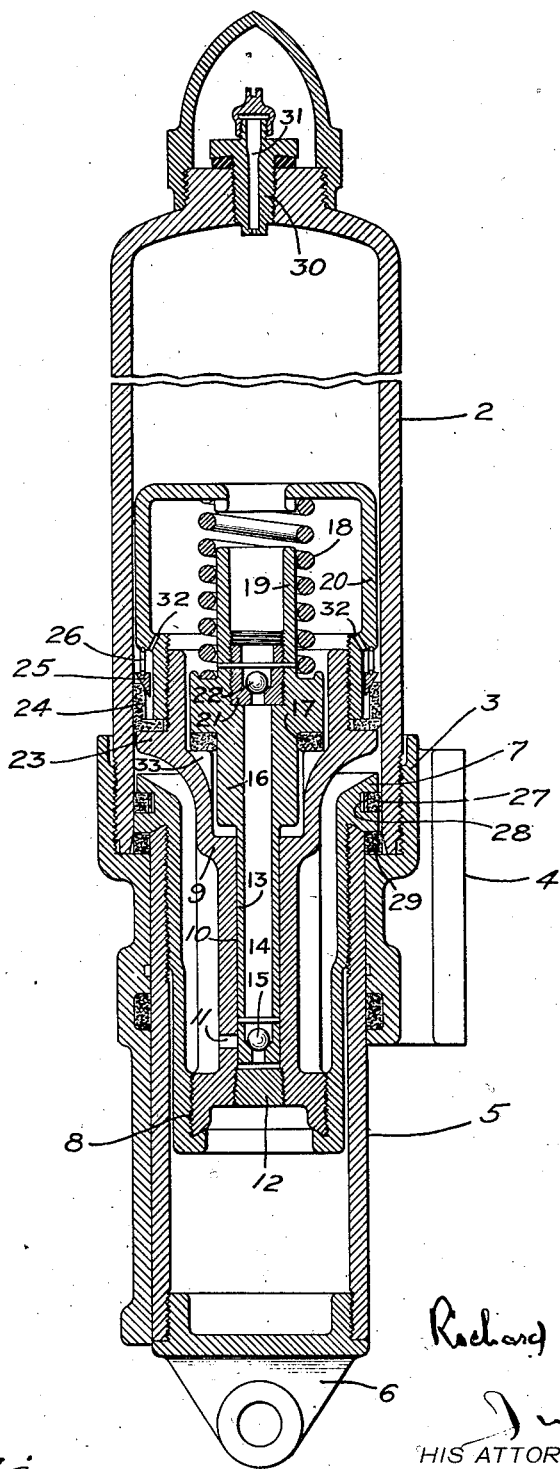
INVENTOR.
Richard Liebau
WITNESSES:
HIS ATTORNEY IN FACT

UNITED STATES PATENT OFFICE.

RICHARD LIEBAU, OF SWISSVALE, PENNSYLVANIA, ASSIGNOR TO THE WESTINGHOUSE AIR SPRING COMPANY, A CORPORATION OF PENNSYLVANIA.

VEHICLE AIR-SPRING.

1,148,177.   Specification of Letters Patent.   Patented July 27, 1915.

Application filed April 12, 1913, Serial No. 760,728.  Renewed December 4, 1913.  Serial No. 804,759.

*To all whom it may concern:*

Be it known that I, RICHARD LIEBAU, a citizen of the United States, and a resident of Swissvale, in the county of Allegheny and State of Pennsylvania, have made a new and useful Invention in Vehicle Air-Springs, of which the following is a specification.

This invention relates to hydropneumatic devices of the type set forth in several applications for patent heretofore filed by me. In the present case, as in the former cases, the invention is embodied in a fluid cushion device adapted for use as a spring in any relation where two bodies are so associated that resilient movement is desirable, and the general object in view in this case as well as in the former cases has been to embody the principles of resilient support by an elastic medium such as air in a commercially practical self-contained, air-tight cushion device which, when used on vehicles such as automobiles or motor trucks in connection with steel springs, or when used alone, will combine all of the desirable features of springs and shock absorbers without the undesirable features thereof. My present invention also resembles that of my said prior applications in so far as a fluid tight joint between sliding surfaces is obtained by means of a cylindrical or cup leather packing tightly clamped in one of the sliding members and having its free edge presented in the direction of the high pressure and yieldingly forced into engagement with the other sliding member by means of a cone, spring pressed in a direction parallel to the axis of the device. It also involves the use of a collecting space for the oil or sealing fluid which finds its way past the leather packing, and of an internal pump for pumping the escaped oil back into the interior or compression chamber of the device, whereby a substantially constant amount of fluid medium within the device is maintained.

The device of this invention which is particularly applicable to motor vehicles such as automobiles, delivery wagons, trucks, etc., will (without any idea of limiting the invention) hereinafter be referred to as an "air spring."

In the drawings, the single figure is a view in longitudinal section of an air spring constructed in accordance with this invention.

The device consists of an outer cylinder 2 to the lower end of which a guard cylinder 3 is threaded. The guard cylinder is provided with a pad 4 adapted to be bolted or otherwise secured to a bracket attached to the frame of the vehicle upon which the air spring is to be used.

Telescopically arranged within cylinders 2 and 3 is an inner cylinder 5 carrying a threaded-in lower end 6 adapted to be shackled or otherwise connected to one end of one of the steel springs on the vehicle. Cylinder 5 fits guard cylinder 3 with a sliding fit and into the upper end thereof a cupped member 7 is threaded.

Threaded at 8 into the lower end of cupped member 7 is a member 9 provided with an internal bore 10 forming a pump chamber. A pump inlet channel 11 leads from the space between members 7 and 9 to the pump chamber and the lower end of the pump chamber is closed by means of a screw plug 12.

A pump plunger 13 which snugly fits within the pump chamber is provided with a central passage 14 and a ball check valve 15 is located at its lower end. The upper end of the pump plunger is formed in the nature of an inertia weight 16 and the plunger is held downwardly onto a buffer 17 (preferably formed of leather) by means of a coil spring 18 which surrounds the upper contracted portion 19 of the plunger and which is held in position by means of a retainer 20 threaded to the exterior upper end of member 9.

The weighted portion 16 of the pump plunger at its upper end is interiorly threaded and a valve plug 21 is secured in the threaded portion and carries a ball check valve 22. Member 9 is provided with a cup leather seat 23, and a cup leather packing 24 is held to said seat by means of retainer 20.

The upper or free edge of the cup leather packing is held in contact with the inner wall of cylinder 2 by means of a cone expander ring 25 yieldingly pressed against the upper inner edge of the cup leather packing by means of an expander spring 26.

The upper portion of cupped member 7 carries a leather wiper or scraper ring 27 yieldingly held in contact with the inner wall of cylinder 2 by means of a flat spring 28 situated behind the wiper ring in a recess in member 7 formed for that purpose. A leather buffer 29 rests on the inner upper portion of guard cylinder 3 and serves as a buffer for the extreme end of the downward or extended movements of cylinder 5. The enlarged portion of cupped member 7 abuts against the buffer ring when the air spring is fully extended as shown in the drawings. A filling plug 30 threaded into the upper end of cylinder 2 is adapted to carry an air filling valve in space 31, of the type commonly employed in pneumatic tires.

After the device is assembled in the manner shown in the drawings, liquid (preferably a medium-bodied lubricating oil) will be introduced through filling plug 30 to about the top of spring 18. Air will then be charged into the spring through the valve in the filling plug until the air spring sustains the load to which it is subjected in about its mid position.

In operation, during sudden shocks to the vehicle running gear occasioned by uneven road surfaces, the weight 16 of the pump plunger, due to its inertia, will cause the pump plunger to reciprocate, the spring 18, of course, always after such reciprocations seating the plunger. During operation the sealing oil which leaks past the cup leather packing will be scraped from the inner surface of cylinder 2 by the wiper ring 27 and will flow down into the chamber formed by cupped member 7 and member 9 and will collect in the bottom of said chamber and as the pump is operated will be pumped back through the passage 14 in the pump plunger past check valve 22 to the interior of the compression chamber.

Retainer member 20 is provided with oil ducts 32 in order that oil within the retainer may readily flow through to the cup leather packing cavity so that the free edge of the cup leather packing (that edge subjected to the high pressure) will always be bathed with a sufficient amount of oil to keep it sealed. Buffer ring 17 rests upon projections 33 formed on member 9 and these projections are provided rather than an annular seat for the buffer in order that the buffer which may adhere to the weight 16 may move freely away from its support.

According to the provisions of the patent statutes I have described the principle of operation of my invention together with the device which I now consider to represent the best embodiment thereof, but I desire to have it understood that the device shown is only illustrative and that the invention can be carried out in other ways.

What I claim is:

1. In a cushion device, relatively movable members having a sliding joint therebetween and formed so as to provide a closed chamber the volumetric capacity of which may be varied, an inertia pump the outlet of which connects with said chamber, and means connecting the inlet of said pump with the low pressure side of said sliding joint.

2. In a cushion device, relatively movable members having a sliding joint therebetween and formed so as to provide a closed chamber the volumetric capacity of which may be varied, a packing for said sliding joint, an inertia pump the outlet of which connects with said chamber, and means connecting the inlet of said pump with the low pressure side of said packing.

3. In a cushion device, relatively movable members having a sliding joint therebetween and formed so as to provide a closed chamber the volumetric capacity of which may be varied, an inertia pump within the device the outlet of which connects with said chamber, and means connecting the inlet of said pump with the low pressure side of said sliding joint.

4. In a cushion device, telescopic members having a sliding joint therebetween and forming a closed chamber the volumetric capacity of which may be varied, an inertia pump the outlet of which connects with said chamber, and means connecting the inlet of said pump with the low pressure side of said sliding joint.

5. In a cushion device, a cylinder, a plunger fitting said cylinder and provided with a packing forming a sliding joint in the interior of said cylinder, an inertia pump carried by said plunger and having its inlet connected to the low pressure side of said packing.

6. In a cushion device, telescopically arranged cylinders the inner of which carries a plunger head, a packing carried by said plunger head and with the interior of the outer cylinder forming a sliding joint, a pump carried by said plunger head, the inlet of which connects with the low pressure side of said packing, and an inertia weight for operating said pump.

7. In a cushion device, telescopically arranged cylinders the inner of which carries a plunger head, a packing carried by said plunger head and with the interior of the outer cylinder forming a sliding joint, a pump carried by said plunger head, the inlet of which connects with the low pressure side of said packing, and an inertia weight and spring for operating said pump.

8. In a cushioning device, relatively movable members inclosing a chamber the volumetric capacity of which is variable, a packing for the sliding joint between said members, a pump having its outlet communicating with the inclosed chamber and its inlet port communicating with the low pressure side of said packing, and a weight movable relatively to said members in substantially the direction of the relative motion between the members for actuating said pump.

9. In a cushioning device, relatively movable members inclosing a chamber, the volumetric capacity of which is variable, a packing for the sliding joint between said members, a pump carried by one of said members and having its inlet port communicating with the low pressure side of said packing, and its outlet communicating with said chamber, and a spring restrained inertia weight, movable independently of said members, operatively connected to the pump plunger.

10. In a cushioning device, relatively movable members inclosing a chamber the volumetric capacity of which is variable, a packing for the sliding joint between said chambers, a pump mounted on one of said members, for delivering liquid leaking past said packing back into said chamber, an inertia weight movable relatively to both of said members for actuating the plunger of said pump, and a spring for yieldingly holding the pump plunger in one extreme position.

11. In a cushioning device, relatively movable members inclosing a chamber the volumetric capacity of which is variable, a packing for the sliding joint between said members, a pump chamber formed in one of said members, and having its inlet port communicating with the low pressure side of the packing and its outlet end communicating with the chamber, a pump plunger located within the pump chamber, and an inertia weight carried by the plunger and movable relatively to both of said members, and a spring for yieldingly holding the plunger at one extreme of its stroke.

12. In a cushioning device, telescopically arranged cylinders, a plunger head mounted on the inner of said cylinders, a packing between said head and the outer cylinder, a pump chamber formed within said head and having an inlet communicating with the low pressure side of the packing and its outlet end communicating with a chamber inclosed by the cylinders and located above the plunger head, a pump plunger mounted within said chamber and adapted to reciprocate relatively thereto, an inertia weight formed integrally with said plunger and movable relatively to both of said members, and a spring for moving said plunger to one extreme position relatively to the pump chamber.

13. In a cushioning device, telescopically arranged cylinders, a cup-member mounted on the inner of said cylinders, a plunger head mounted on the inner of said cylinders and partially surrounded by said cup member, a packing between the plunger head and the outer cylinder, located above the cup member, a pump plunger located in a pump chamber formed within the plunger head, and having an inlet port communicating with the low pressure side of the packing, and an inertia weight for actuating the pump plunger movable independently of both of said cylinders.

14. In a cushioning device, telescopically arranged members inclosing a chamber, the volumetric capacity of which is variable, a packing between said members, a pump chamber carried by one of said members and having an inlet communicating with the low pressure side of said packing, a pump plunger located within the pump chamber for delivering leakage liquid from the low pressure side to the high pressure side of the packing, an inertia weight movable independently of both of said members for actuating said pump plunger, a spring for yieldingly holding the pump plunger in one extreme position with relation to the pump chamber, and a buffer carried by said plunger for checking the motion imparted thereto by said spring.

15. In a cushioning device, telescopically arranged members inclosing a chamber the volumetric capacity of which is variable, a packing for the sliding joint between said members, a pump plunger coöperating with a pump chamber provided on one of said members, to deliver leakage liquid from the low pressure to the high pressure side of the packing, and an inertia weight movable independently of both of said members for operating the plunger.

16. In a cushioning device, telescopically arranged cylinders, a cup member located within and carried by the inner of said cylinders, a plunger head mounted on said cup member and partially surrounded thereby, a packing between the plunger head and the outer cylinder with its low pressure side communicating with said cup member, a pump plunger movably mounted on the plunger head and within a pump chamber having an inlet communicating with the cup member, valves carried by the pump plunger for delivering liquid from the pump chamber to a chamber inclosed by the outer of said cylinders and located above the plunger head, a spring-restrained inertia weight movable relatively to both of said cylinders for actuating said pump plunger, a guard cylinder secured to the outer of said first-mentioned cylinders and partially surrounding the inner cylinder, and a buffer carried by the guard cylinder and adapted to be engaged by the cup member.

17. A cushioning device comprising telescopically arranged cylinders, a plunger head carried by the inner cylinder and having a pump chamber formed therein, a packing between the plunger head and the outer cylinder and having its low pressure side communicating with the inlet of the pump chamber, a pump plunger located within the pump chamber and having a valved passage formed therein for delivering liquid from the pump chamber to a chamber inclosed by the outer of said cylinders and located above the plunger head, an inertia weight for actuating the pump plunger, a spring for yieldingly holding the pump plunger in one extreme position relatively to the chamber, a buffer carried by the pump plunger for resisting the motion imparted by said spring, a guard cylinder secured to the outer of said cylinders and partially surrounding the inner, and a buffer carried by said guard cylinder for checking the extreme motion of the inner cylinder relatively to the outer cylinder.

18. In a cushion device, relatively movable member inclosing a chamber, the volumetric capacity of which is variable, a packing for the sliding joint between said members, and an inertia pump for returning liquid leaking past said packing to said chamber.

19. In a cushion device, a cylinder, a member fitting within said cylinder and forming therewith a chamber of variable volumetric capacity, a packing between the interior of the cylinder and the plunger, and an inertia pump for returning liquid leaking past said packing into said chamber.

20. In a cushion device, a cylinder, a member fitting within said cylinder and forming therewith a chamber of variable volumetric capacity, a packing between the interior of the cylinder and the plunger, and an inertia pump for delivering fluid to said chamber.

21. In a cushioning device, telescoping members inclosing a chamber of variable volumetric capacity, and a pump carried by one of said members for delivering fluid under pressure to said chamber and having a weighted movable element; the action of said pump being solely dependent upon the inertia of said movable element.

22. In a cushioning device, telescoping members inclosing a chamber of variable volumetric capacity, a pump carried by one of said members for delivering fluid under pressure to said chamber, and having a weighted movable element; the action of said pump being solely dependent upon the inertia of said movable element, and means for yieldingly resisting the movement of said element in one direction.

In testimony whereof, I have hereunto subscribed my name this 8th day of April, 1913.

RICHARD LIEBAU.

Witnesses:
C. W. McGHEE,
ANNA CLOHERTY.